Oct. 29, 1929.  H. D. HELLMERS  1,733,537
PROCESS FOR RECOVERING BORAX FROM BRINE
Filed Oct. 26, 1927  2 Sheets-Sheet 1
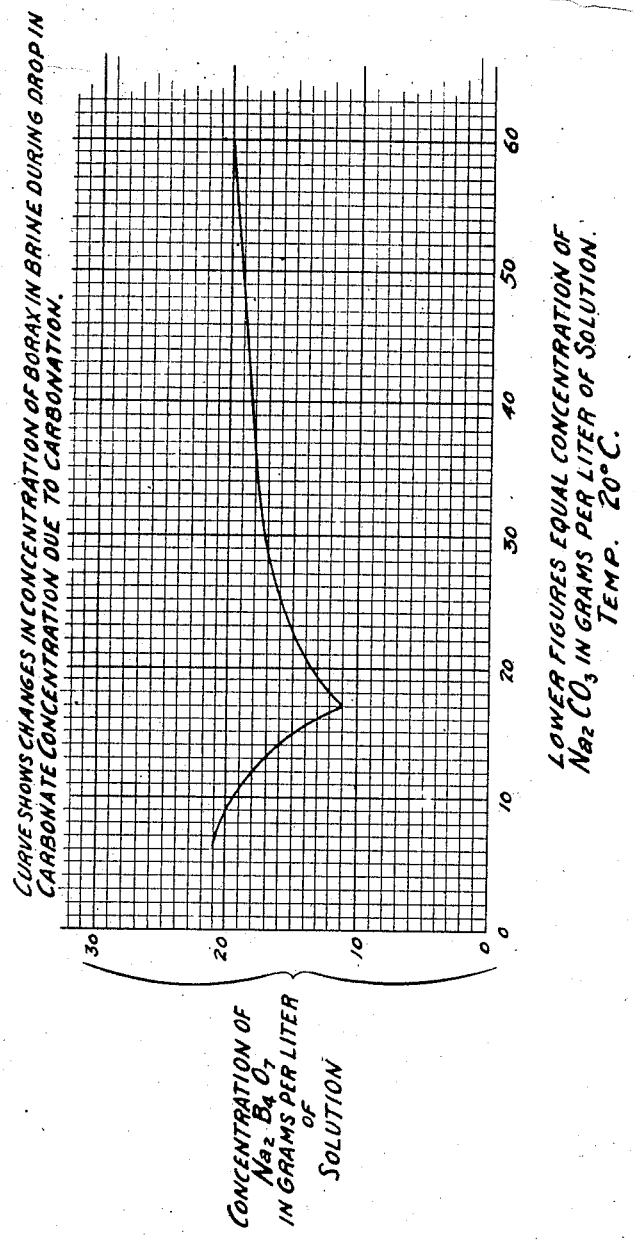
INVENTOR
HENRY D. HELLMERS
BY
ATTORNEYS.

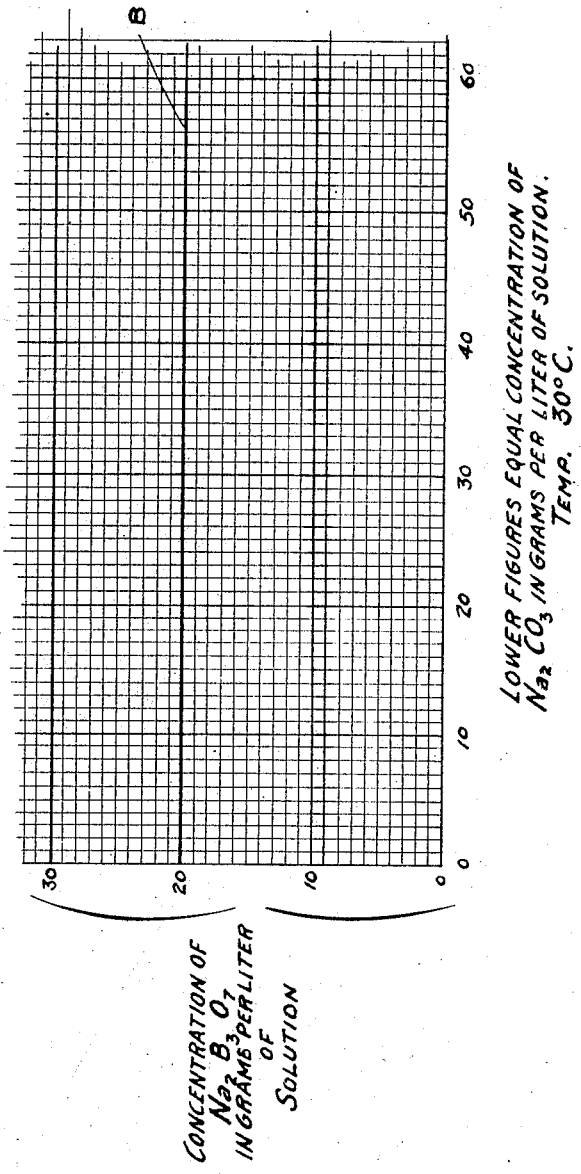

Patented Oct. 29, 1929 1,733,537

UNITED STATES PATENT OFFICE

HENRY D. HELLMERS, OF WESTEND, CALIFORNIA, ASSIGNOR TO WEST END CHEMICAL COMPANY, OF OAKLAND, CALIFORNIA, A CORPORATION OF CALIFORNIA

PROCESS FOR RECOVERING BORAX FROM BRINE

Application filed October 26, 1927. Serial No. 228,924.

This application for Letters Patent is a continuation in part of my prior application, Serial No. 64,686, filed October 24th, 1925, wherein I have described a method of treating natural brines containing borate and other salts of sodium, particularly carbonates, and the chief object of the invention is to provide an effective and economical process for obtaining borax of substantial purity from brines of the kind indicated, preferably though not necessarily without preliminary concentration. A further object is to provide an effective and economical process for treating the brine of Searles Lake, California, and accordingly the preferred practice of the invention is described as applied to the treatment of Searles Lake brine with the understanding, however, that the invention is susceptible of use with other brines, such modifications as may be necessary being readily made by a skilled chemist who undertakes to carry out the invention in practice.

My analysis of Searles Lake brine shows it to be about as follows in composition:

|  | Grams per liter |
|---|---|
| NaCl | 210 |
| $Na_2SO_4$ | 89 |
| $Na_2CO_3$ | 62.1 |
| K. Cl | 66.7 |
| $B_2O_3$ as sodium borates | 14.5 |

In the treatment of brines of this general character with carbonic acid gas (carbon dioxide) for the precipitation of the carbonates largely or entirely as bicarbonates, I have discovered a change in the borax suspending properties of the liquid, that will permit the recovery and separation of a large part of the soda content, as a solid and obtain a solution, from which the maximum amount of borax may be crystallized.

In the accompanying drawings chart No. 1 shows graphically the average concentration of borax and sodium carbonates in brine as it is pumped in its raw state from Searles Lake and the change in concentration of these substances during treatment with carbonic acid gas, carried out at temperatures below 25 degrees centigrade.

In chart No. 1 the initial concentration in grams per liter of both salts is taken at the right hand end of the chart, the figures along the base line indicating the changing concentration of the sodium carbonates and the curve indicating the relative changing concentration of the borax as taken against the values of the vertical scale. When the brine is treated with carbonic acid gas by any suitable means, a precipitation of the bicarbonate of sodium occurs, as well as a precipitation of some of the borax, probably in the form of tetraborate to be later re-dissolved as treatment progresses. Upon continuing the gas treatment, the carbonate concentration falls from the initial 60 or more grams per liter and if lowered to about ten g. p. l. or less, the largest part of the borax that may have crystallized during the progress of the $CO_2$ treatment, will have gone back into solution, thus leaving but very little borax precipitated even if cooled or agitated.

I believe the following to be the explanation of the behavior of the borax and soda during carbonation as described above:

Part of the $CO_2$ gas reacts with sodium carbonate to form bicarbonate: $Na_2CO_3$ plus $CO_2$ plus $H_2O = 2NaHCO_3$.

And part reacts with the sodium metaborate present to form sodium tetraborate: $2Na_2B_2O_4$ plus $2CO_2$ plus $H_2O = Na_2B_4O_7$ plus $2NaHCO_3$.

After all of the carbonates have been converted to the bicarbonate and all of the borates converted to the tetraborate, then further $CO_2$ treatment will probably result in a system that has an excess of $CO_2$ in solution forming carbonic acid. This carbonic acid is a stronger acid than boric acid, and therefore, an equilibrium is probably established, where some of the boric acid in the tetraborate is replaced by carbonic acid, and some free boric acid results in solution: $Na_2B_4O_7$ plus $2CO_2$ plus $7H_2O = 4H_3BO_3$ plus $2NaHCO_3$. This results in an increased solubility of total $B_2O_3$ and the borax that is precipitated during earlier stages of carbonation goes back into solution, as soon as enough of $CO_2$ has been applied.

Whether the foregoing explanation is correct or not, the fact remains that treatment with carbon dioxide to a substantial excess results in a re-solution of a large if not the major portion of any borax that may have been precipitated earlier in the treatment.

I have also observed that should the carbonation be carried out with a brine, the temperature of which is as high as 25 degrees C., to start with, little or no borax will be crystallized during any stage of the carbonation, probably because of the increased solubility of tetraborate at this higher temperature. The chemical reactions involved are presumably the same as those described for the lower temperatures but actual physical precipitation of the borax will not take place to the same extent if at all. This is graphically shown on chart No. 2, where the curve denoting the amount of borax in solution during the progress of the gas treatment, at a brine temperature above 25 degrees, is shown to be essentially a straight line during the whole of the treatment period. It should be noted that carbonation need not be carried so far with brines at the higher temperature as at lower, and my invention is not limited to this higher temperature, because if carbonation be continued, in case of brines below 25 degrees C., till the soda content is reduced to about 7 or 8 grams per liter, such borax as has been precipitated will be re-dissolved and at the finish of the gas treatment we find that the liquor is substantially and in some cases sensibly the same as the liquor resulting from carbonation of brine above 25 degrees, and the succeeding steps in my process are carried out in the same way regardless of whether brines of above or below 25 degrees have been carbonated.

In either case if the treated brine, after separating from the precipitated bicarbonate of sodium, be then mixed with an alkaline precipitating agent combining with boric acid to form sodium tetraborate, as for instance with a portion of untreated or partly treated brine or other soda such as a solution of normal sodium carbonate or borax liquors that are not saturated with carbon dioxide gas, then the above described reaction is reversed and an equilibrium may be established where substantially all of the borate is converted to the tetraborate, the following reactions (apparently) occurring:

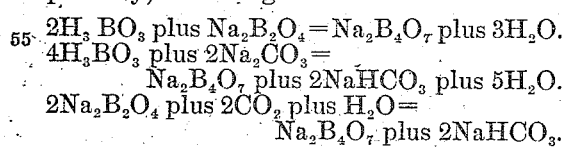

This results in a solution supersaturated with respect to tetraborate and this may be crystallized out by cooling to less than 25 degrees, if necessary, and preferably applying agitation also. The reduction of the carbonate concentration to about 7 to 8 g. p. l. or less is not necessarily the critical point, but is found to be a satisfactory concentration for carrying out the process described.

In either case the precipitated or crystallized borax may be separated from the mother liquor by any suitable means and then further purified by washing or re-crystallizing as desired.

In contemplating my invention as above set forth, it should be noted that it involves on commercial scale the precipitation of nearly pure borax from raw lake brine that has not undergone any preliminary concentrating treatment by evaporation as well as from brine that has undergone such treatment.

It is upon the discovery of the changing solubility of borax in such brines during treatment with $CO_2$ gas for various periods, and at various temperatures, and particularly of the fact that borax, precipitated by carbonation of comparatively cool solutions may be re-dissolved if gas treatment be continued long enough, as indicated by the charts that my invention is based, as well as upon the original idea of increasing the alkali content of the treated brine from which the bicarbonate has been extracted by means of the addition of untreated brine or its equivalent.

Older methods in the prior art have provided for a certain degree of separation of the borax and soda in such brines, from each other, and from the other salts present, but invariably such processes have yielded a borax containing material amounts of carbonates of soda, and a carbonate of soda containing a considerable amount of borax. This condition has made the refining of these substances to a commercial state of purity, expensive and wasteful. By my process, it is easily possible to obtain carbonates of soda, consisting almost entirely of the bicarbonate, which do not contain more than about one per cent of anhydrous borax. Moreover, and this is an important point, this bicarbonate can be obtained in the form of large firm crystals which are easily separated from the mother liquor, and are easily and quickly washed clean of adhering brine. And the borax which I separate out contains usually less than one per cent of sodium carbonate. It is largely this practically perfect separation of these substances in the first step of operation, thus materially reducing or eliminating the cost of the subsequent secondary refining operation, that makes my discovery of value to the art. This is well illustrated by the fact that the bicarbonate which I produce is pure enough to be sold direct to the trade without any purification whatever except such washing of the crystals as may be obtained on the ordinary rotary drum filter which may be used in removing the crystals from the mother liquor. Or it may be converted to soda ash of salable quality by the ordinary roasting operation, and without the secondary purification which is usually necessary before a salable soda ash can be produced.

I will describe my process as it has been practiced on a commercial scale. Several variations are possible, but the following has been found to be a satisfactory application of my invention:

Brine of about the composition given at the beginning of this specification is pumped from Searles Lake directly to standard carbonating towers. It is well to note, as of economic interest, that no preliminary evaporation or concentration, in solar ponds or elsewhere, is necessary or in general desirable. This tower is of small diameter, compared to its height, and is furnished at regular intervals, one above the other, with galvanized metal discs of the same diameter as the tower itself, and perforated with many small holes evenly distributed.

The carbonic acid gas (carbon dioxide) is obtained from an adjacent lime kiln and is about 39 per cent pure, the other 61 per cent being principally nitrogen and a small amount of other constituents of the air.

This mixed gas containing about 39 per cent carbon dioxide is drawn from the lime kiln, and compressed to about 37 pounds pressure in an ordinary gas compressor and is then introduced through pipes into the bottom of the carbonating towers. As this gas pressure is slightly in excess of the static head of brine in the tower, it bubbles upward through the brine, and as the bubbles of gas ascend they strike the perforated discs described above.

These discs act as baffles and break up the bubbles into smaller sizes and tend to distribute them throughout the whole area of the tank and this process is repeated as the gas bubbles in their ascent impinge upon and make their way through the perforations in each succeeding disc. The gas supply is so regulated that when the gas has reached the top of the tower, practically all the carbon dioxide which it contained has been absorbed. While the gas is being admitted into the bottom of the carbonating towers, a stream of raw brine is coming into each tower at the top, and a corresponding amount of finished or carbonated brine is being drawn off through a pipe at the bottom.

The flow of incoming and outgoing brine is kept in balance so that the brine level in the tower is maintained substantially constant at a point near the top. We have therefore a continuous stream of gas bubbling upward into the tower and a slow movement of brine downward, so that the brine entering at the top in the raw state emerges from the bottom with the carbonating step of my process completed. During the progress or passage of the brine through the tower in this way, the strength of the brine in sodium carbonate, which was about 62 grams per liter in the raw brine, has been brought down to about 8 grams per liter in the brine discharged at the bottom of the tank; bicarbonate of soda to the amount of about one ton to every fifteen tons of brine, has appeared in the brine in the shape of firm white crystals; the borax in the brine probably has assumed the form of either tetraborate, or boric acid, and moreover, the brine itself has become saturated with an excess of carbonic acid gas. In this way about 125 to 150 tons of brine is treated per day in each carbonating tower and is thus made to react with about four tons of carbon dioxide contained in the mixed lime kiln gases.

During this treatment the temperature of the brine varies from 20 degrees centigrade which is the average of the brine coming to the towers from the lake, to about 28 or 29 degrees centigrade, which is the temperature of the finished brine discharged. This increase in temperature during the carbonation is due largely to the heat generated by the chemical reactions taking place. It should be noted that I apply no external heat. This is another fact which tends to make my process economical in operation.

As the carbonated brine flows out from the bottom of the carbonating towers it draws with it the crystals of sodium bicarbonate which have formed, and at this stage the borax minerals remain disssolved in the brine, virtually only the bicarbonate having assumed solid crystalline form. This brine with the entrained crystals of bicarbonate of soda is run to a settling tank where the crystals settle to the bottom, and the brine, now with borax compounds in solution and containing an excess of carbon dioxide gas is drawn off as a clear liquor. The bicarbonate crystals are now run from the bottom of the settling tank on to the usual type of revolving vacuum filter. As is well known, this filter subjects the crystals to the suction draught of a vacuum pump which draws off most of the adhering mother liquor, then sprays the crystals with fresh water and in turn draws off the greater part of this. These crystals are now ready to be dried and sold as commercial bicarbonate, or they may be put through the usual ash furnace and discharged as marketable soda ash. It is important to note that there is no re-dissolving or stirring up with wash water, or any other refining step required, in making this soda salable.

The carbonated brine from which the soda crystals have been strained off is pumped into an open shallow vat or tank. About 75 per cent by weight of raw brine from the lake is added to it and the mixture is circulated with a pump which takes brine from the bottom of the vat and discharges it back into the top of the vat through nozzles which break it up into a fine spray. This circulation has the double effect of making an intimate mixture of the raw brine with the carbonated brine, thoroughly agitating this mixture, and the spraying cools the mixture off to such an extent that borax is precipitated from the brine in crystals which collect in the bottom of the vat. The temperature drop thus obtained amounts to from 10 to 15 degrees. About one ton of borax is recovered from each sixty tons of carbonated brine. It is recovered from the mother liquor in the vat in the same way as has been described for recovering the soda.

It is not to be supposed that the above procedure must be followed. I have merely described the details of plant technique as practised in an operating commercial plant. There are various other effective methods of carrying out the steps of my process, and I do not wish to be limited to any particular mechanical procedure, nor to any source of gas.

The temperatures and quantities and chemical analyses given are not absolute but have been found satisfactory, although good results will be had when conditions, within reasonable limits, vary plus or minus from the figures quoted. This process, if operated substantially according to the figures given provides a cheap and practical method for producing soda and borax from natural or artificial brines.

I claim:

1. The method of recovering borax from brine containing borate in solution together with sodium carbonates and other salts which comprises treating the brine with carbonic acid gas for precipitation of carbonates to a degree where borax has been converted to free boric acid in solution, removing precipitated sodium bicarbonate from the solution, converting the boric acid in solution to sodium tetraborate by addition of normal sodium carbonate thereto, and crystallizing out the borax.

2. The method of recovering borax from brine containing borate in solution together with sodium carbonate which comprises treating the brine with carbonic acid gas to precipitate some of the carbonates, removing the precipitated carbonates from the solution, adding untreated brine to the solution, and crystallizing out the borax.

3. The method of recovering borax which comprises treating substantially unevaporated brine from Searles Lake, California, at a temperature below twenty-five (25) degrees centigrade with carbonic acid gas to precipitate some of the salts, removing the precipitated carbonates from solution, adding a portion of untreated brine at approximately the same temperature to the solution and crystallizing out the borax.

4. The method of recovering borax from brine containing borate in solution together with sodium carbonate which comprises treating the brine at a temperature above approximately twenty-five (25) degrees centigrade with carbonic acid gas to precipitate some of the salts, separating the precipitated salts from the solution, adding a portion of untreated brine at a similar temperature to the solution and crystallizing out the borax.

5. The process of treating brine containing carbonates of sodium and sodium borates which comprises treating the brine below approximately twenty-five (25) degrees centigrade with $CO_2$ until any borax that has been precipitated during the earlier stages of the carbonation has been largely redissolved, separating the precipitated salts of sodium from the solution, mixing the solution with untreated brine and crystallizing out the borax.

6. In a method of producing commercial bicarbonate of soda from brine of low borax content, converting sodium metaborate to sodium bicarbonate, sodium tetraborate and boracic acid by addition of an excess of $CO_2$ sufficient to hold borax compounds in solution during the separation of bicarbonate from the brine.

7. In a method of treating brine of low borax content, converting sodium metaborate to sodium bicarbonate, sodium tetraborate and boracic acid by addition of an excess of $CO_2$ gas sufficient to hold the borax in solution while the bicarbonate is separated from the brine, and adding untreated brine to the carbonated brine for precipitating the borax.

8. The method comprising treating brine containing carbonates of sodium, and borates of sodium with $CO_2$ gas until commercial bicarbonate only is precipitated, separating the sodium bicarbonate from the treated brine, and crystallizing out the borax by addition of an alkaline precipitating agent combining with boric acid to form sodium tetraborate.

9. Treating brine containing carbonate of sodium and borates of sodium with $CO_2$ gas to a point where an excess of $CO_2$ gas maintains the borax in solution.

10. The method of extracting borax from brine containing sodium carbonate and borate comprising adding to natural brine a quantity of brine from which a portion of the carbonates has been removed and which contains an excess of $CO_2$ gas.

HENRY D. HELLMERS.